(12) United States Patent
Lee et al.

(10) Patent No.: US 10,256,987 B2
(45) Date of Patent: Apr. 9, 2019

(54) COMMUNICATION APPARATUS AND METHOD OF CONTROLLING THE SAME

(71) Applicant: SAMSUNG ELECTRONICS CO., LTD., Suwon-si (KR)

(72) Inventors: Hyun Joo Lee, Seoul (KR); Chung Yong Eom, Seoul (KR); Yang Don Lee, Suwon-si (KR); Man Jib Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 347 days.

(21) Appl. No.: 14/294,536

(22) Filed: Jun. 3, 2014

(65) Prior Publication Data

US 2014/0371878 A1    Dec. 18, 2014

(30) Foreign Application Priority Data

Jun. 13, 2013  (KR) .................. 10-2013-0067584

(51) Int. Cl.
  *G05B 15/02* (2006.01)
  *H04L 12/28* (2006.01)
  (Continued)

(52) U.S. Cl.
  CPC .......... *H04L 12/2803* (2013.01); *G05B 15/02* (2013.01); *H04L 41/022* (2013.01);
  (Continued)

(58) Field of Classification Search
  CPC ............ H04L 12/2834; H04L 67/2842; H04L 67/1097; H04L 63/0428; H04L 63/0464; H04L 29/08801; H04L 29/08891
  (Continued)

(56) References Cited

U.S. PATENT DOCUMENTS

| | | | |
|---|---|---|---|
| 2004/0138786 A1* | 7/2004 | Blackett | G01D 4/00 700/295 |
| 2004/0153594 A1 | 8/2004 | Rotvold et al. | |

(Continued)

FOREIGN PATENT DOCUMENTS

| | | |
|---|---|---|
| EP | 1 241 828 A1 | 9/2002 |
| WO | 2006/015245 A2 | 2/2006 |
| WO | 2006/015245 A3 | 2/2006 |

OTHER PUBLICATIONS

Qinzheng Kong et al., "Integrating Cobra and TMN Environments", 1996 IEEE Network Operations and Management Symposium, (NOMS), Kyoto, Apr. 15-19, 1996, New York, IEEE, US, vol. 1, pp. 86-96.

(Continued)

*Primary Examiner* — Joseph E Avellino
*Assistant Examiner* — Marshall M McLeod
(74) *Attorney, Agent, or Firm* — Staas & Halsey LLP

(57) ABSTRACT

A communication apparatus to interconnect a plurality of devices using multiple protocols includes a protocol layer having a plurality of protocol objects obtained by objectifying the protocols used by the devices, and a control layer to check a protocol used for data transmission if data is transmitted, to convert a protocol object corresponding to the checked protocol into a preset control object, to convert the preset control object into another protocol object, and to transmit the data to a device connected to the converted other protocol object. Since operatively coupled control is allowed between devices using different protocols, extensibility and flexibility may be achieved. Besides, since an abstraction layer is divided into a control layer and a protocol layer, an interface may not be changed even when protocols are added, protocol conversion may be easily (Continued)

performed, and routing between multiple protocols may be performed using, for example, a logic editor.

16 Claims, 10 Drawing Sheets

(51) Int. Cl.
*H04L 12/24* (2006.01)
*H04L 29/06* (2006.01)
*H04L 29/08* (2006.01)

(52) U.S. Cl.
CPC ...... *H04L 41/0226* (2013.01); *H04L 41/0233* (2013.01); *H04L 69/08* (2013.01); *H04L 69/18* (2013.01); *H04L 69/321* (2013.01); *H04L 41/069* (2013.01)

(58) Field of Classification Search
USPC ................ 709/203, 212, 213, 217, 218, 219
See application file for complete search history.

(56) References Cited

U.S. PATENT DOCUMENTS

| | | | |
|---|---|---|---|
| 2006/0067209 A1* | 3/2006 | Sheehan | ........... H04L 29/08846 370/216 |
| 2011/0061015 A1* | 3/2011 | Drees | ..................... G05B 15/02 715/771 |
| 2013/0083012 A1* | 4/2013 | Han | ....................... G05B 15/02 345/419 |

OTHER PUBLICATIONS

European Search Report dated Sep. 15, 2014 issued in corresponding European Patent Application 14170497.3.
European Communication dated Mar. 26, 2018 in European Patent Application No. 14170497.3.

\* cited by examiner

* DATA TYPE    [ANALOG]

* OBJECTS
  [D1]
  [D2]
  [D4]

[OK]    [CANCEL]

COMMUNICATION APPARATUS AND METHOD OF CONTROLLING THE SAME

CROSS-REFERENCE TO RELATED APPLICATIONS

This application claims the benefit of Korean Patent Application No. 10-2013-0067584, filed on Jun. 13, 2013 in the Korean Intellectual Property Office, the disclosure of which is incorporated herein by reference.

BACKGROUND

1. Field

One or more embodiments of the present disclosure relate to a communication apparatus for communication between different devices, and a method of controlling the same.

2. Description of the Related Art

Buildings are large-scale and highly functionalized, and various facilities for air conditioning, sanitation, electricity, security, fire protection, etc. are combined in a complex fashion in a typical building.

A building automation system (BAS) is constructed to monitor and control these facilities and includes a central control management system (CCMS), a direct digital controller (DDC), and local devices.

In order to allow a large amount of control and monitoring information to be shared between various local devices and a system (e.g., a CCMS to control air conditioning, electricity, lighting, parking, elevators, etc.), a BAS should have a reliable and fast communication infrastructure. Building automation and control network (BACnet) is adopted as an international communication standard related to building automation.

That is, a BAS has a subsystem designed to adopt only one protocol necessary for each controller.

In this case, devices supporting a BACnet protocol are compatible with each other while devices not supporting the BACnet protocol are not. That is, devices using different protocols are not compatible with each other.

As described above, since different protocols (BACnet, LonWorks, Modbus, KNX, etc.) are used in the field of building automation, compatibility is low and some device functions are canceled or changed. In order to solve this problem, the need for integrated control has increased.

In addition to the above problem, when compatibility between a device using a BACnet protocol and a device using a non-BACnet protocol is achieved for communication therebetween, control may not be possible according to a message type used to perform protocol conversion.

Besides, in an environment such as a smart grid (a home energy management system (HEMS) or a building energy management system (BEMS)), in some cases, a message should be transmitted and received between devices using different protocols. However, the devices may not communicate with each other due to the different protocols.

Here, the term "smart grid" refers to a system that allows a user to consume electricity differently from a routine consumption pattern in response to electricity demand. As such, devices that respond to electricity demand are being developed, and these devices communicate with and control operations of an electricity controller or other devices.

As described above, due to an environment such as a smart grid (an HEMS or a BEMS), a large number of devices using various protocols are operatively coupled to a system, their configurations become complicated and requirements are frequently changed, and thus it is not easy to provide an integrated control environment to a user.

SUMMARY

Therefore, it is an aspect of the present disclosure to provide a communication apparatus for communication between devices using different protocols, and a method of controlling the same.

It is another aspect of the present disclosure to provide a communication apparatus to generate logic based on data types and performing routing between different protocols using the generated logic, and a method of controlling the same.

It is a further aspect of the present disclosure to provide a communication apparatus to perform protocol conversion to ensure compatibility between devices and performing integrated event processing to perform protocol conversion, and a method of controlling the same.

Additional aspects of the disclosure will be set forth in part in the description which follows and, in part, will be obvious from the description, or may be learned by practice of the disclosure.

In accordance with one aspect of the present disclosure, a communication apparatus to interconnect a plurality of devices using multiple protocols, the communication apparatus including a protocol layer having a plurality of protocol objects obtained by objectifying the protocols used by the devices, and a control layer to check a protocol used for data transmission if data is transmitted, to convert a protocol object corresponding to the checked protocol into a preset control object, to convert the preset control object into another protocol object, and to transmit the data to a device connected to the converted other protocol object.

The other protocol object may be a protocol object corresponding to a protocol used by a device corresponding to a destination based on a result of analyzing the data.

The protocol layer may have the protocol objects respectively corresponding to the protocols used by the devices.

The protocol layer may have the protocol objects according to types of the data.

The communication apparatus may further include a database to store connection information between the protocol layer and the control layer.

The database may further store data types of the protocol objects.

The communication apparatus may further include an interface to interconnect the protocol layer and the control layer.

The interface may include an object mapper to check protocol objects having the same data type, to output devices connected to the checked protocol objects as objects, and to perform mapping on one of the protocol objects selected by a user.

The interface may further include a logic editor to interconnect input and output modules of a plurality of objects selected by a user.

The communication apparatus may further include an event processor to convert data received by the protocol layer from a device, into a control response signal of a control object, and to perform protocol conversion to transmit a control request signal received by the control layer from an interface, to at least one device.

The event processor may include an event dispatcher to transmit and receive the control response signal and the control request signal between the protocol layer and the control layer, and a protocol router to convert the data transmitted from the protocol layer to the control layer, into the control response signal, and to convert a protocol of the control request signal transmitted from the control layer to the protocol layer.

The event processor may further include an event trigger to store a time according to each control request signal, and connection information between the control object and a protocol object according to the control request signal, and to transmit the connection information to the protocol router upon determining that the time corresponds to a time to output the control request signal as an event signal.

The protocol router of the event processor may determine whether a new control request signal is a signal to be periodically triggered, if the new control request signal is received, and may transmit the new control request signal to the event trigger upon determining that the new control request signal is the signal to be periodically triggered.

The protocol router of the event processor may determine whether protocol conversion is required if a new control request signal is received, may perform protocol conversion upon determining that protocol conversion is required, and may transmit protocol conversion information to a database.

The communication apparatus may further include a database to store connection information and conversion information between the control object and a protocol object according to each control request signal, and the control response signal according to the data.

The protocol layer may verify validity of the received data, and the control layer may verify validity of the received control request signal.

The objectifying of the protocols used by the devices includes determining whether a protocol used by a device of the plurality of devices is an object-oriented protocol and converting, by the protocol layer, the protocol used by the device into the object-oriented protocol if the protocol is determined as a non-object-oriented protocol and otherwise not converting the protocol used by the device into the object-oriented protocol.

In accordance with another aspect of the present disclosure, a method of controlling a communication apparatus to interconnect a plurality of devices using multiple protocols includes transmitting a control request signal transmitted from a control layer of an abstraction layer, to a protocol router if the control request signal is received by an event dispatcher, determining whether protocol conversion is required, by analyzing the control request signal received by the protocol router, performing protocol conversion upon determining that protocol conversion is required, and transmitting the control request signal to a device using a protocol subjected to protocol conversion.

The method may further include transmitting the control request signal to a device using a protocol the same as the protocol of the control layer upon determining that protocol conversion of the control request signal is not required.

The method may further include storing protocol conversion information in a database.

The method may further include registering information about the control request signal in an event trigger upon determining that the control request signal is a signal to be periodically triggered.

The method may further include verifying, by the control layer of the abstraction layer, validity of the received control request signal.

In accordance with another aspect of the present disclosure, a method of controlling a communication apparatus to interconnect a plurality of devices using multiple protocols, includes transmitting data transmitted from a protocol layer of an abstraction layer, to a protocol router if the data is received by an event dispatcher, detecting a control response signal corresponding to the received data from the protocol router, and transmitting the detected control response signal to a control layer of the abstraction layer.

The method may further include verifying, by the protocol layer of the abstraction layer, validity of the received data.

In accordance with another aspect of the present disclosure a building automation system includes a plurality of devices using different protocols, a central controller, and a communication apparatus to interconnect the plurality of devices. The communication apparatus includes a protocol layer having at least one protocol object obtained by converting a protocol used by a first device, of the plurality of devices, into an object-oriented protocol when the protocol used by the first device is determined as a non-object-oriented protocol and a control layer to check a protocol used for data transmission if data is transmitted, to convert a protocol object corresponding to the checked protocol into a preset control object, to convert the preset control object into another protocol object, and to transmit the data to a second device, connected to the converted other protocol object, of the plurality of devices.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 5 and 6 are schematic diagrams showing display units of the interface of the communication apparatus illustrated in FIG. 2;

DETAILED DESCRIPTION

Figure 1:
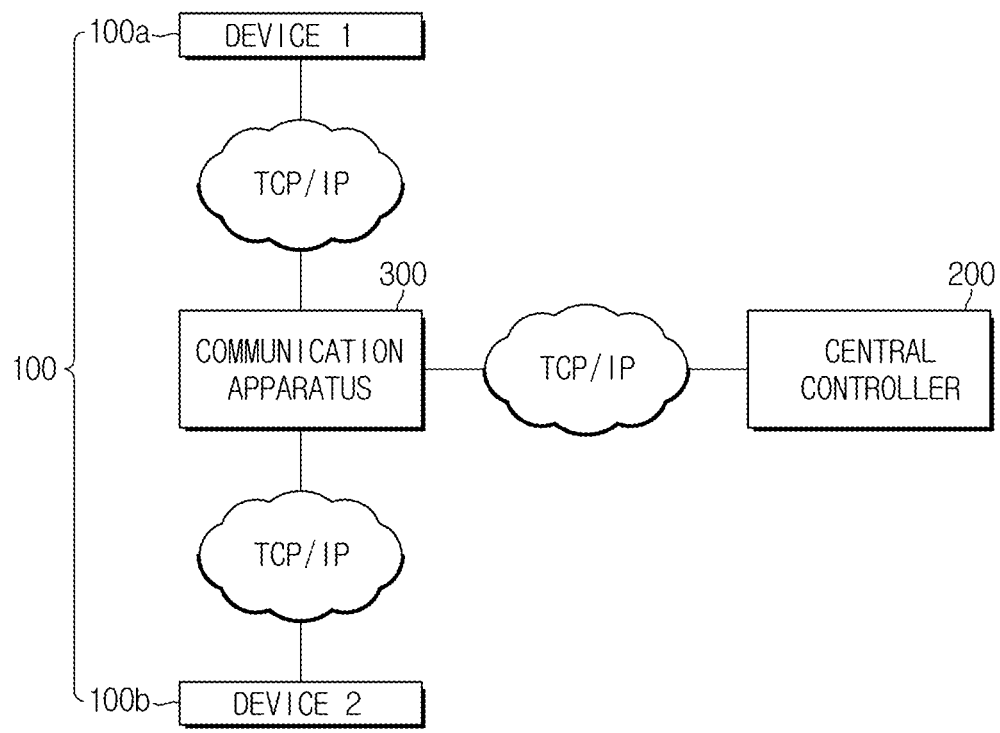
FIG. 1 is a block diagram of a building automation system (BAS) including a communication apparatus according to an embodiment of the present disclosure.

Reference will now be made in detail to embodiments of the present disclosure, examples of which are illustrated in the accompanying drawings, wherein like reference numerals refer to like elements throughout. The embodiments are described below to explain the present disclosure by referring to the figures.

FIG. 1 is a block diagram of a building automation system (BAS) including a communication apparatus 300 according to an embodiment of the present disclosure. The BAS may include, for example, a plurality of devices 100, e.g., a first device 100*a* and a second device 100*b*, a central controller 200, and the communication apparatus 300.

The BAS enables efficient management and safety improvement of a building by integrally controlling heating, ventilation, air conditioning, elevators, lighting devices, window shades, blinds, safety features, and various sensors to sense, for example, fire, a monitoring device using cameras, etc. and thereby providing optimal control via remote monitoring and operatively coupled control.

In addition, the BAS allows efficient management of energy by achieving, for example, efficient operations, reduction in load, utilization of ambient energy, and reduction in electricity consumption of the devices 100.

The devices 100 may include various electric, electronic, and communication devices located outside of, in, or around the building for maintenance, security, and energy control of the building such as air conditioners, elevators, lighting devices, window shades, blinds, safety features, various sensors, and cameras.

Alternatively, the devices 100 may be configured as a plurality of devices included in one apparatus. For example, the devices 100 may include a room temperature sensor, a temperature sensor of a heat exchanger, a humidity sensor, a fan, and a user interface, each included in an air conditioner.

Each of the devices 100 operates based on a command input by a user or a building manager, and transmits the input command and operation information to the central controller 200.

Alternatively, the device 100 may operate based on environment information inside or outside the building, or a command of the central controller 200. Here, the environment information is information sensed by a sensor, information input by the user, or preset information.

For example, if the device 100 is a lighting device, it may be turned on or off based on seasonal information, date information, sunshine amount information, building location information, and exterior information.

If the device 100 is an air conditioner, it may perform a cooling or heating operation based on temperatures inside and outside the building, which are sensed by sensors.

The device 100 may be connected to the communication apparatus 300 via, for example, by transmission control protocol/Internet protocol (TCP/IP), Ethernet, wireless, or serial communication, and may transmit the command input by the user and the operation information to the communication apparatus 300.

The above-described device 100 may communicate with the central controller 200 via the communication apparatus 300, and also may communicate with another device 100 via the communication apparatus 300. That is, the first and second devices 100*a* and 100*b* communicate with each other. In addition, the first and second devices 100*a* and 100*b* may be operatively coupled to each other.

Here, the first and second devices 100*a* and 100*b* may be devices produced by the same manufacturer and having the same model name, devices produced by the same manufacturer but having different model names, devices produced by different manufacturers and having different model names, or devices of different types. For example, the first device 100*a* may be an air conditioner and the second device 100*b* may be a lighting device.

The central controller 200 may be connected to the communication apparatus 300 via, for example, TCP/IP, Ethernet, wireless, or serial communication, and may communicate with at least one device 100 via the communication apparatus 300.

The central controller 200 may also be configured as any of the devices listed previously. Alternatively, the central controller 200 may be implemented using one or more general-purpose or special purpose computers, such as, for example, a workstation, a processor, a controller and an arithmetic logic unit, a digital signal processor, a microcomputer, a field programmable array, a programmable logic unit, a microprocessor, a gateway, a router, or any other device capable of responding to and executing instructions in a defined manner.

The central controller 200 may control operation of the device 100 using information sensed by a sensor (not shown), information input by the user, or preset information.

For example, the central controller 200 transmits an operation command to an air conditioner if a current time is a preset time.

The central controller 200 may receive a command and operation information from at least one device 100, and may control another device 100 based on the transmitted command and the operation information.

For example, if an air conditioner is powered on by the user, the central controller 200 checks a current illumination level, transmits an on control signal to a lighting device if the current illumination level is less than a preset level, and transmits an off control signal to the lighting device if the current illumination level is equal to or greater than the preset level.

The communication apparatus 300 interconnects the devices 100 via communication, and also interconnects at least one device 100 and the central controller 200 via communication. The communication may occur wirelessly or via wire.

That is, the communication apparatus 300 allows communication between the devices 100 using different protocols, and between the device 100 and the central controller 200 using different protocols. A protocol may apply to all aspects of data communication and may include addressing, network access, electrical signaling, error checking, flow control, message sequencing, message segmentation, presentation format, and message format.

The communication apparatus 300 may be implemented as a gateway or a router, and may have an interface supporting a building automation and control network (BACnet) protocol, a Modbus protocol, a LonWorks protocol, an EZ-7 protocol, a DVM protocol, etc. used in the BAS, and is extensible to support other protocols.

Figure 2:
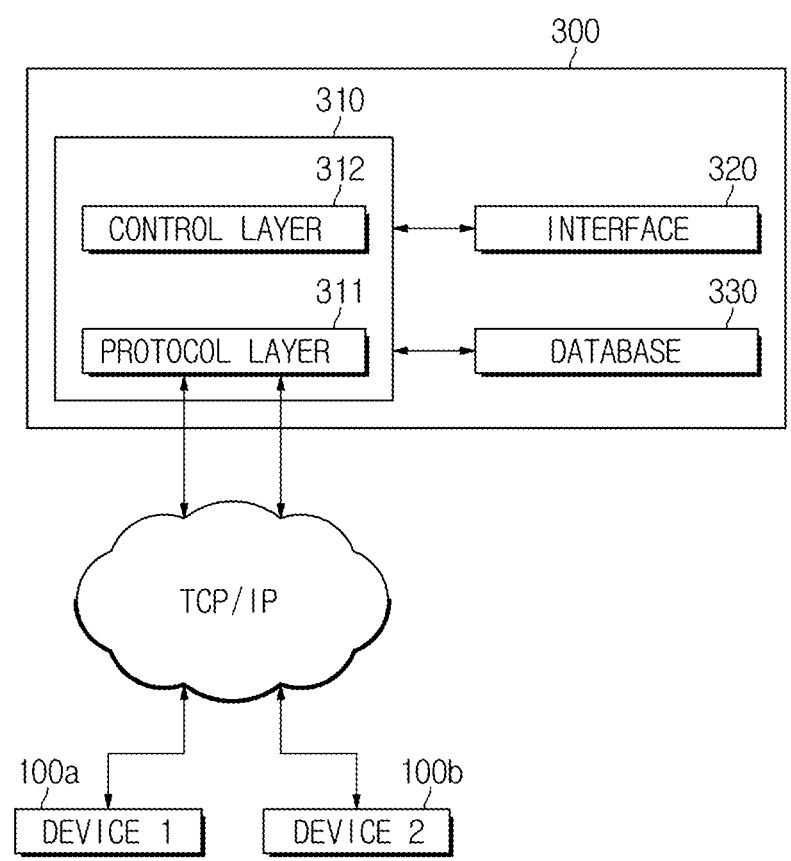
FIG. 2 is a block diagram of the communication apparatus illustrated in FIG. 1.

As illustrated in FIG. 2, the communication apparatus 300 may include, for example, an abstraction layer 310, an interface 320, and a database 330.

The abstraction layer 310 is divided into two layers to control protocols in efficient and extensible ways. In this case, the communication apparatus 300 may control device objectification information.

That is, the abstraction layer 310 includes a protocol layer 311 having a plurality of protocol objects, and a control layer 312 having at least one control object.

The protocol layer 311 determines whether a protocol used by the device 100 is an object-oriented protocol and converts the protocol used by the device 100 into an object-oriented protocol if it is determined that the protocol is a non-object-oriented protocol. If the protocol of the device 100 is already an object-oriented protocol, the protocol layer 311 need not convert the object-oriented protocol.

For example, since the BACnet protocol is an object-oriented protocol and the Modbus protocol is a non-object-oriented protocol, the protocol layer 311 need not convert the BACnet protocol if data is received from a device 100 that performs communication using the BACnet protocol, while the protocol layer 311 converts the Modbus protocol into an object-oriented protocol if data is received from a device 100 that performs communication using the Modbus protocol.

If data transmitted from at least one device 100 is received, the protocol layer 311 analyzes the received data to check a protocol used by the device 100, determines whether there is a protocol object corresponding to the checked protocol, and allows communication using the protocol object upon determining that there is a protocol object corresponding to the checked protocol.

That is, the protocol layer 311 stores the protocol objects to convert protocols of the devices 100 into object-oriented protocols.

The above protocol layer 311 stores the protocol objects according to types of the protocols used by the devices 100. Alternatively, the protocol layer 311 may store the protocol objects according to types of the devices 100.

The control layer 312 stores the control object to convert the protocol objects stored in the protocol layer 311, into a preset protocol.

The control layer 312 converts the protocol objects determined by the protocol layer 311, into a preset control object.

For example, the control layer 312 converts the protocol objects of the BACnet protocol and the Modbus protocol into the preset control object.

The control layer 312 stores algorithms to convert the protocol objects into the preset control object according to types of the protocol objects. Alternatively, the control layer 312 may store algorithms to convert the protocol objects into the preset control object according to device types or data types. That is, the control layer 312 may generate an instance of the control object for each device 100.

For example, the protocol objects include a BACnet object, a Modbus object, a LonWorks object, an EZ-7 object, and a DVM object, and the control object includes a first algorithm to convert the BACnet object into the preset control object, a second algorithm to convert the Modbus object into the preset control object, a third algorithm to convert the LonWorks object into the preset control object, a fourth algorithm to convert the EZ-7 object into the preset control object, and a fifth algorithm to convert the DVM object into the preset control object, for example.

Here, BACnet using a data type as a control protocol of the device 100 is described as an example. Data types of BACnet include analog input, analog output, binary input, binary output, multi-state input, multi-state output, schedule, trend log, etc.

The control layer 312 checks a data type of the first device 100a to transmit data, and allows communication between protocol objects having a data type the same as or substantially similar to the checked data type.

For example, if the first device 100a uses a BACnet protocol and analog data is to be transmitted, the control layer 312 converts the BACnet protocol of the first device 100a into a protocol object and then converts the converted protocol object into a preset control object, checks a device 100 having analog input data, checks a protocol object of the checked device 100, and converts the converted control object into the checked protocol object, thereby allowing communication between devices 100 using different protocols.

The control layer 312 checks a plurality of devices 100 having the same data type or substantially similar data type, outputs information about the checked devices 100 via the interface 320, and connects the control object to a protocol object of at least one device 100 selected on the interface 320, based on the information about the device 100. A data type may be substantially similar if data may be communicated efficiently with minimal error.

That is, the control layer 312 interconnects protocol objects using different protocols by using the control object.

As described above, the control layer 312 allows message transmission between different devices 100 based on connection information between the protocol objects and the control object.

The control layer 312 may interconnect different devices 100 having different data types if conversion is allowed between the two data types.

The interface 320 receives registration information of devices 100 to be controlled via the communication apparatus 300. In this case, the interface 320 may also receive an input of, for example, protocols used by the devices 100 to be registered.

The interface 320 outputs information about a plurality of devices 100 having the same data type or interconnectable by converting data types, and transmits connection information of at least one device 100 to the control layer 312 if the device 100 is selected by the user.

Figure 3:
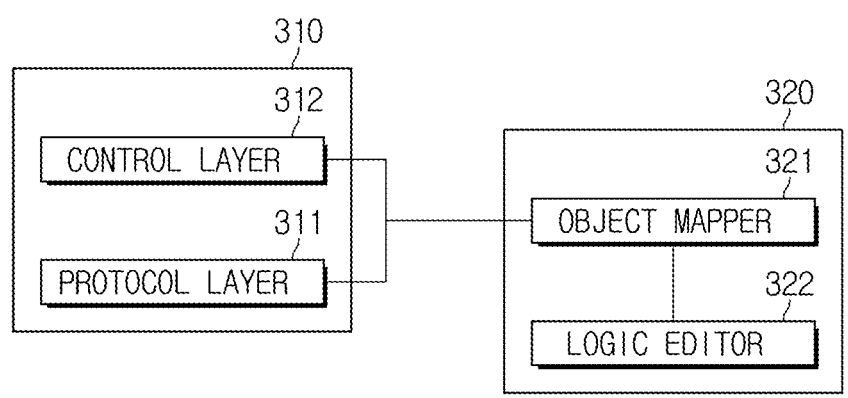
FIG. 3 is a block diagram of an interface of the communication apparatus illustrated in FIG. 2.

As illustrated in FIG. 3, the interlace 320 includes an object mapper 321 and a logic editor 322.

The object mapper 321 matches a protocol object of an object (i.e., device) selected by the user, to a control object and thus allows message transmission between devices 100 using different protocols. In this case, the object mapper 321 interconnects different objects in consideration of data types.

In more detail, the object mapper 321 displays only objects having the same data type on a display unit 321a (see FIG. 5), maps an object selected by the user from among the objects displayed on the display unit 321a, generates connection information between a protocol object of the mapped object (i.e., device) and the control object, and stores the generated connection information.

The object mapper 321 displays only objects having the same data type or substantially similar data type on one window of the display unit 321a, and may display logically interconnectable objects having different data types on different windows according to the data types.

For example, if objects having different data types are logically interconnectable, the object mapper 321 displays only objects having an analog data type in a first window of the display unit 321a and displays only objects having a binary data type in a second window of the display unit 321a.

If the protocol objects and the control object are completely interconnected as described above, data input/output (I/O) to and from the devices 100 is allowed.

The logic editor 322 sets routing information for communication between devices 100 using different protocols.

That is, if routing of a message is required between the devices 100, the logic editor 322 allows routing by setting an I/O connection. In this case, the logic editor 322 interconnects input and output modules having the same data type.

The logic editor 322 generates logic to input/output a message, and transmits an I/O message generated by at least one device 100 to another device 100 via routing according to the generated logic and regardless of protocol types.

The database 330 stores the connection information between the protocol objects and the control object, and the data types of the protocols of the devices 100.

The above-described operation will now be described in detail with reference to FIGS. 4 to 6.

Figure 4:
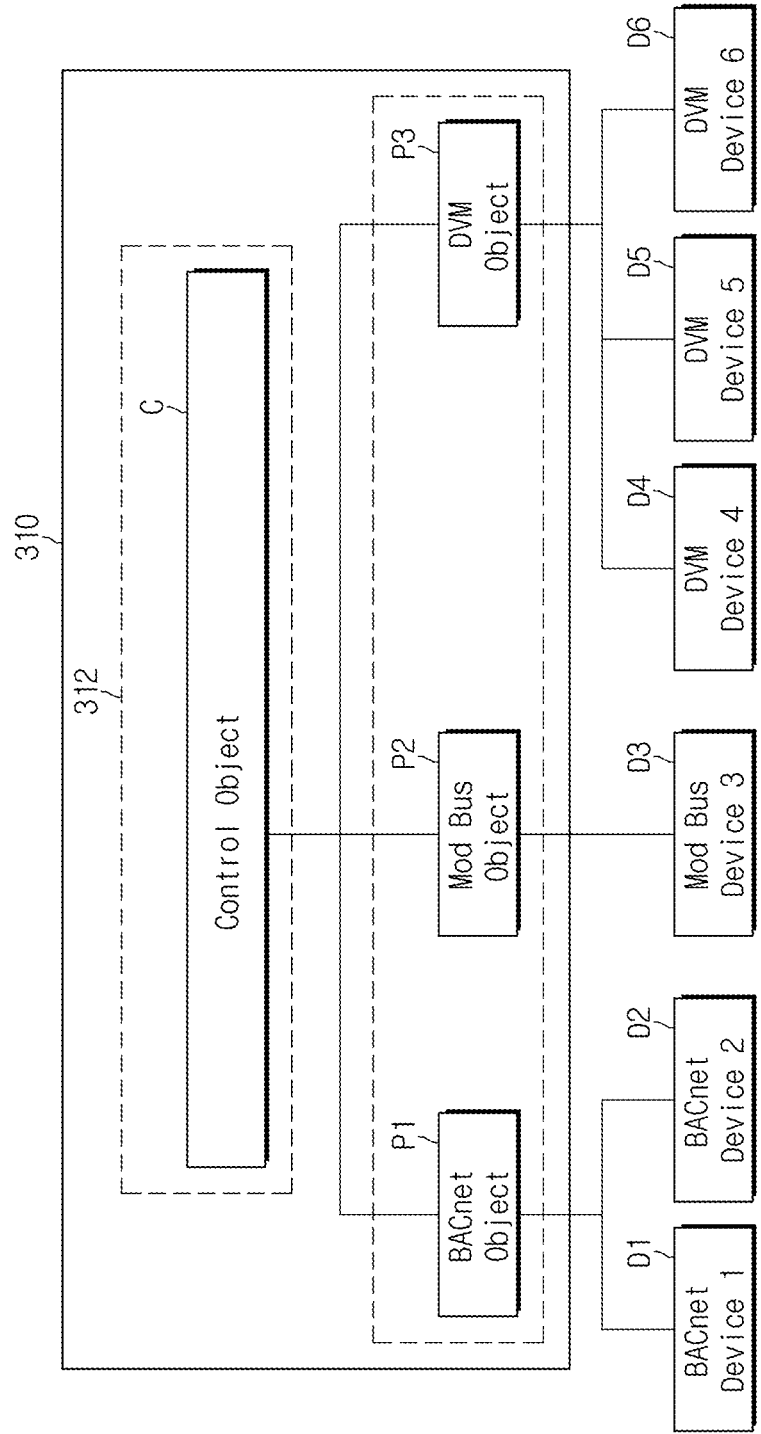
FIG. 4 is a schematic diagram showing objectification of the communication apparatus illustrated in FIG. 2.

As illustrated in FIG. 4, in an example embodiment it is assumed that a plurality of devices includes a first device D1 and a second device D2 using a BACnet protocol, a third device D3 using a Modbus protocol, and a fourth device D4, a fifth device D5, and a sixth device D6 each using a DVM protocol, and that the first, second, and fourth devices D1, D2, and D4 have an analog data type while the third, fifth, and sixth devices D3, D5, and D6 have a binary data type.

In this case, the protocol layer 311 of the abstraction layer 310 has a BACnet object P1, a Modbus object P2, and a DVM object P3 as protocol objects.

Alternatively, the protocol layer 311 may have a BACnet object of the first device D1, a BACnet object of the second device D2, a Modbus object of the third device D3, a DVM object of the fourth device D4, a DVM object of the fifth device D5, and a DVM object of the sixth device D6.

The control layer 312 of the abstraction layer 310 receives information about the first through sixth devices D1 through D6 from the BACnet object P1, the Modbus object P2, and the DVM object P3. Here, the information may include, for example, device types, protocol types, and data types.

The control layer 312 has an algorithm to convert the BACnet object P1 into a preset control object C, an algorithm to convert the Modbus object P2 into the preset control object C, and an algorithm to convert the DVM object P3 into the preset control object C.

The control layer 312 further has an algorithm to convert the preset control object C into the BACnet object P1, an algorithm to convert the preset control object C into the Modbus object P2, and an algorithm to convert the preset control object C into the DVM object P3.

That is, the control layer 312 converts different protocol objects into an integrated control object, and converts the control object into each of the different protocol objects.

As such, the control layer 312 interconnects devices using different protocols.

The display unit 321a of the interface 320 displays devices having the same data type or substantially similar data type as objects based on the data types of the first through sixth devices D1 through D6.

As illustrated in FIG. 5, the object mapper 321 of the interface 320 displays devices having the same data type as objects on the display unit 321a.

The interface 320 displays the first, second, and fourth devices D1, D2, and D4 having the same data type, as objects, and transmits information about at least one object to the abstraction layer 310 if the object is selected by the user.

In this case, the abstraction layer 310 interconnects the control object and the protocol object of the object selected on the interface 320, and the database 330 stores connection information between the control object and the protocol object.

For example, if the objects of the first, second, and fourth devices D1, D2, and D4 are selected by the user and then an OK button is selected, information about the selected first, second, and fourth devices D1, D2, and D4 is transmitted to the abstraction layer 310.

Assuming that data is transmitted from the fourth device D4 to the first and second devices D1 and D2, the control layer 312 converts the BACnet object of the fourth device D4 into the control object, converts the converted control object into the BACnet object of the first device D1, and also converts the converted control object into the DVM object of the second device D2.

That is, the control layer 312 generates connection information to interconnect the DVM object of the fourth device D4, the control object, and the BACnet object of the first device D1, and connection information to interconnect the DVM object of the fourth device D4, the control object, and the BACnet object of the second device D2. As such, the fourth device D4 and the first device D1 are interconnected, and the fourth device D4 and the second device D2 are also interconnected.

Generation of logic when connection information between devices using different protocols is generated is now described with reference to FIG. 6.

Thus far, an example of generating logic for communication between devices using different protocols and having different data types has been described. A case that data is transmitted from the third device D3 to the first device D1 will now be described. Here, it is assumed that the data type of the third device D3 is analog and the data type of the first device D1 is binary.

Figure 6:
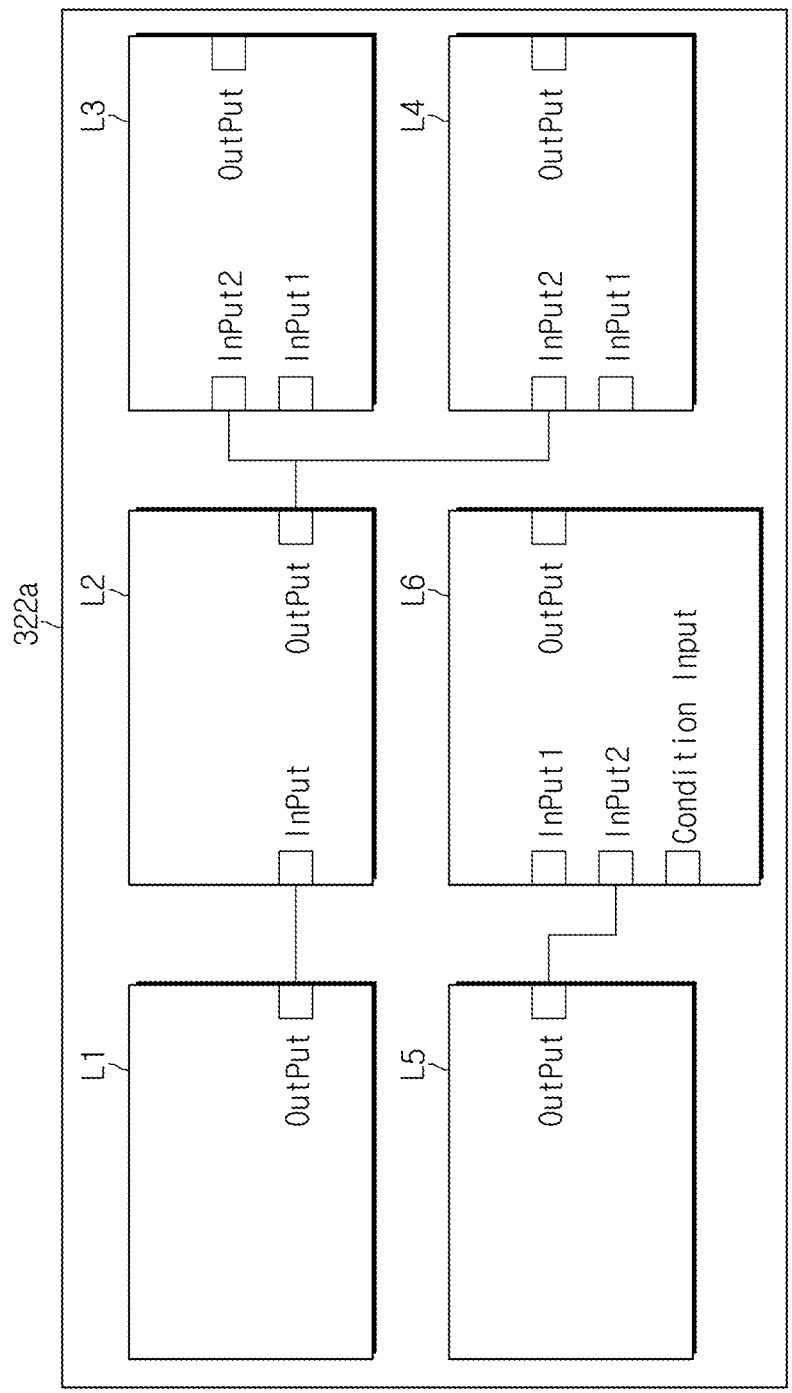

As illustrated in FIG. 6, if the third device D3 is selected as an object, the logic editor 322 of the interface 320 generates and displays first logic L1 on a display unit 322a of the logic editor 322, and outputs other objects connectable to an output module of the first logic L1, on the display unit 321a of the object mapper 321.

Upon determining that the first device D1 having a data type different from the data type of the third device D3 is selected by the user, the logic editor 322 generates second logic L2 to convert analog data into binary data and displays the second logic L2 on the display unit 322a of the logic editor 322, and generates third logic L3 connected to an output module of the second logic L2 to receive the converted data input from the second logic L2, and displays the third logic L3 on the display unit 322a of the logic editor 322.

In this case, the output module of the first logic L1 is connected to an input module of the second logic L2, and the output module of the second logic L2 is connected to an input module of the third logic L3. Here, the second logic L2 includes an algorithm to convert analog data into binary data.

For example, if the second logic L2 includes an algorithm indicating "output '1' if input data is equal to or greater than 20, and output '0' if the input data is less than 20", the first logic L1 outputs analog data of 60 via its output module to the second logic L2, the second logic L2 compares 60, i.e., the input data, to 20 and outputs "1" via the output module thereof because the input data is equal to or greater than 20, and the third logic L3 receives "1" via the input module thereof. In this case, the data "1" of the third logic L3 is transmitted to the first device D1.

Here, the algorithm of the second logic L2 is changeable according to user input.

If the first device D1 is operatively coupled to the second device D2, fourth logic L4 connected to the output module of the second logic L2 may also be generated.

That is, an input module of the fourth logic L4 is connected to the output module of the second logic L2 and thus the data output from the second logic L2 is input to the fourth logic L4. In this case, the data transmitted from the third device D3 is transmitted to the first and second devices D1 and D2.

An example of generating logic for communication between devices using different protocols but having the same data type will now be described. A case that data is transmitted from the first device D1 to the fourth device D4 is described.

If the first device D1 is selected as an object, the logic editor 322 of the interface 320 generates and displays fifth logic L5 on the display unit 322a of the logic editor 322, and outputs other objects connectable to an output module of the fifth logic L5, on the display unit 321a of the object mapper 321.

Upon determining that the fourth device D4 having a data type the same as the data type of the first device D1 is selected by the user, the logic editor 322 generates sixth logic L6 connected to the output module of the fifth logic L5 to receive data input from the fifth logic L5, and displays the sixth logic L6 on the display unit 322a of the logic editor 322.

In this case, if the sixth logic L6 has a plurality of input modules, an input module of the fifth logic L5 is connected to one of the input modules having a data type the same as the data type of the output module of the fifth logic L5.

As described above, if data transmitted from at least one device is received, the communication apparatus 300 checks a protocol and a data type of the device, determines a protocol object corresponding to the checked protocol, interconnects the protocol object and a control object based on the determined protocol object and the data type, and stores connection information between the protocol object and the control object in the database 330. After that, the abstraction layer 310 allows data transmission between different devices or between a device and a central controller using logic information and the connection information between the protocol object and the control object.

Here, although a BAS is described above as an example of a system including a communication apparatus, a smart grid system is also applicable.

In the smart grid system, devices may be electric devices used within an electricity control area, and a central controller may be an electricity controller (a demand response (DR) controller) to control operation of at least one electric device based on electricity information.

Figure 7:
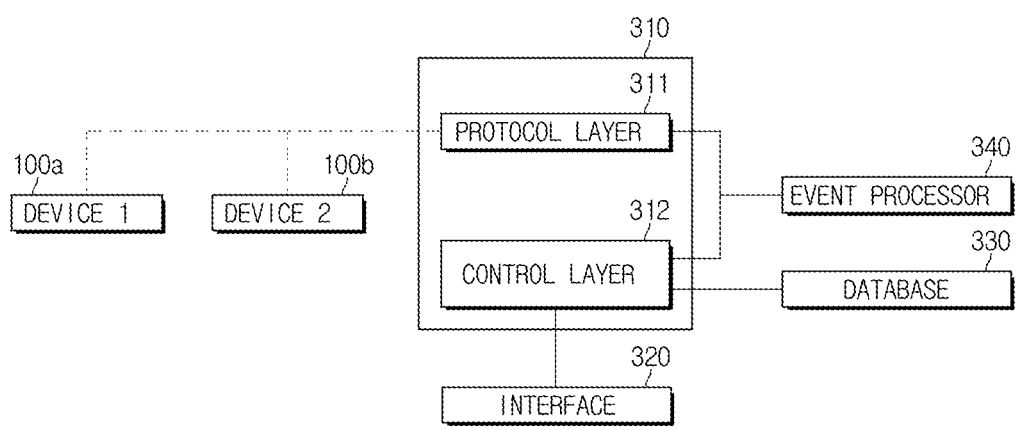
FIG. 7 is a block diagram of a communication apparatus according to another embodiment of the present disclosure.

FIG. 7 is a block diagram of the communication apparatus 300 according to another embodiment of the present disclosure. The current embodiment is described with reference to FIGS. 7 and 8.

The communication apparatus 300 interconnects the devices 100, e.g., the first device 100a and the second device 100b, via wired or wireless communication, and also interconnects at least one device 100 and the central controller 200 via wired or wireless communication.

That is, the communication apparatus 300 allows communication between the devices 100 using different protocols, and between the device 100 and the central controller 200 using different protocols.

The communication apparatus 300 may be implemented as a gateway or a router, and may have an interface supporting a BACnet protocol, a Modbus protocol, a LonWorks protocol, an EZ-7 protocol, a DVM protocol, etc. used in the BAS, and is extensible to other protocols.

If an event signal is generated by at least one device 100 or the central controller 200, the communication apparatus 300 verifies validity of the generated event signal and transmits the event signal to a destination if the validity is verified.

Here, the event signal is generated when data is converted between protocols.

The communication apparatus 300 may perform initialization. In this case, the communication apparatus 300 initializes a control object and protocol objects, stores the initialized control object and the protocol objects in an object list, forms correlations between the control object and the protocol objects based on the object list after initializing devices 100 operatively coupled by the protocol objects, and performs a trigger thread on a registered event.

The above-described communication apparatus 300 may include, for example, the abstraction layer 310, the interface 320, and the database 330, and may further include an event processor 340.

The abstraction layer 310 is divided into two layers to control protocols in efficient and extensible ways. In this case, the communication apparatus 300 may control device objectification information.

That is, the abstraction layer 310 includes the protocol layer 311 having a plurality of protocol objects, and the control layer 312 having at least one control object.

The protocol layer 311 converts a protocol used by the device 100, into an object-oriented protocol when the protocol is determined as a non-object-oriented protocol. If the protocol of the device 100 is determined to already be an object-oriented protocol, the protocol layer 311 need not convert the object-oriented protocol.

That is, the protocol layer 311 generates and stores a protocol object of each device 100 as an instance.

If data transmitted from at least one device 100 is received, the protocol layer 311 verifies validity of the received data. If a protocol event request signal is received from the event processor 340, the protocol layer 311 verifies validity of the received protocol event request signal.

In more detail, the protocol layer 311 determines whether data transmitted from at least one device 100 is received, verifies validity of the received data upon determining that the data has been received, converts the data into a protocol event response signal if the validity of the received data is verified, and transmits the converted protocol event response signal to an event dispatcher 341 of the event processor 340.

The protocol layer 311 determines whether a protocol event request signal is received from the event dispatcher 341 of the event processor 340, verifies validity of the received protocol event request signal upon determining that the protocol event request signal has been received from the event dispatcher 341, converts the protocol event request signal into data using a protocol corresponding to the protocol event request signal if the validity of the received protocol event request signal is verified, and transmits the converted data to the device 100.

The control layer 312 stores a control object to convert the protocol objects stored in the protocol layer 311 into one preset protocol.

The above-described control layer 312 generates an instance of the control object for each device 100.

That is, the control layer 312 converts the protocol objects of the protocol layer 311 into a preset control object.

The control object of the control layer 312 may use a protocol that is the same as, or compatible with, the protocol used by one of the protocol objects of the protocol layer 311.

For example, assuming that the protocol objects include objects using a BACnet protocol, Modbus protocol, LonWorks protocol, EZ-7 protocol, DVM protocol, etc., the control object may be an object using the BACnet protocol.

The control layer 312 receives a control request signal of the interface 320, verifies validity of the control request signal, receives a control response signal from the event processor 340, and verifies validity of the control response signal.

In more detail, the control layer 312 determines whether a control request signal is received from the interface 320, verifies validity of the received control request signal upon determining that the control request signal is received from the interface 320, and transmits the control request signal to the event dispatcher 341 of the event processor 340 if the validity of the received control request signal is verified.

The control layer 312 determines whether a control response signal is received from the event dispatcher 341 of the event processor 340, verifies validity of the received control response signal upon determining that the control response signal is received from the event dispatcher 341, and transmits the control response signal to the interface 320 if the validity of the received control response signal is verified.

The interface 320 transmits a command input by a user, to at least one device 100 or the central controller 200. In this case, the input command is transmitted to another device 100 after validity thereof is verified by the event processor 340.

The database 330 stores routing information between the protocol objects and the control object, and also stores configuration information of the devices 100, which is required to periodically perform an event.

Here, the routing information includes connection information to interconnect a source object and a destination object via a request and a response for object mapping.

For example, if object mapping is required from the control object to a first protocol object and a second protocol object, the source object is the control object and the destination object includes the first and second protocol objects.

If communication between the devices 100 and the communication apparatus 300 and communication between the interface 320 and the communication apparatus 300 use different protocols, the event processor 340 performs integrated event processing between the different protocols.

Figure 8:
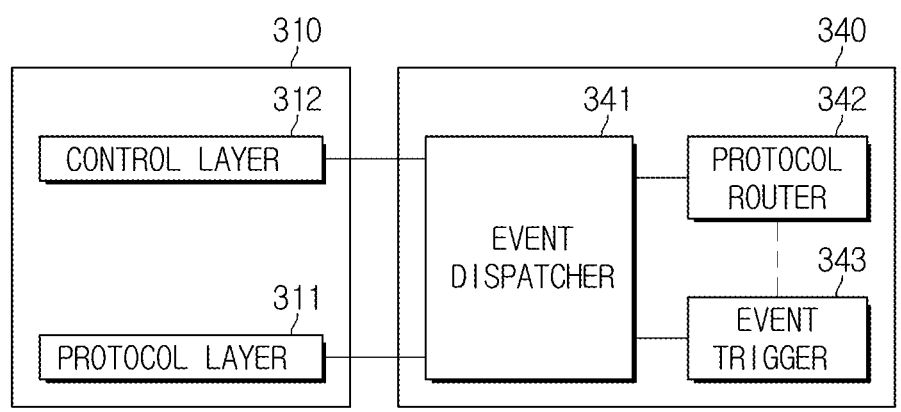
FIG. 8 is a block diagram of an event processor of the communication apparatus illustrated in FIG. 7.

As illustrated in FIG. 8, the event processor 340 may include, for example, the event dispatcher 341, a protocol router 342, and an event trigger 343.

The event dispatcher 341 is operatively coupled to the protocol layer 311 and the control layer 312.

That is, the event dispatcher 341 transmits the control request signal to the protocol layer 311 to convert the control request signal into data using a protocol used by at least one device 100, and transmits the data to the control layer 312 to convert the data into the control response signal.

If the control request signal transmitted from the control layer 312 is received, the protocol router 342 determines whether protocol routing is required for operatively coupled control between devices 100, based on the received control request signal, generates the protocol event request signal upon determining that the protocol routing is required, and transmits the protocol event request signal to a corresponding protocol object of the protocol layer 311.

The protocol router 342 generates and transmits the protocol event request signal to the protocol object of the protocol layer 311.

If an event operation is periodically required, the protocol router 342 forms configuration information required to perform the event operation and registers the configuration information in the event trigger 343.

The event trigger 343 performs triggering if the event operation is required aperiodically.

The event trigger 343 periodically checks an event time based on the registered configuration information, and performs triggering to notify the protocol router 342 that an event has been generated, upon determining that the event time has arrived.

Here, the configuration information includes an event time of the control request signal, a control object of the control request signal, and conversion and connection information of at least one protocol object.

Figure 9:
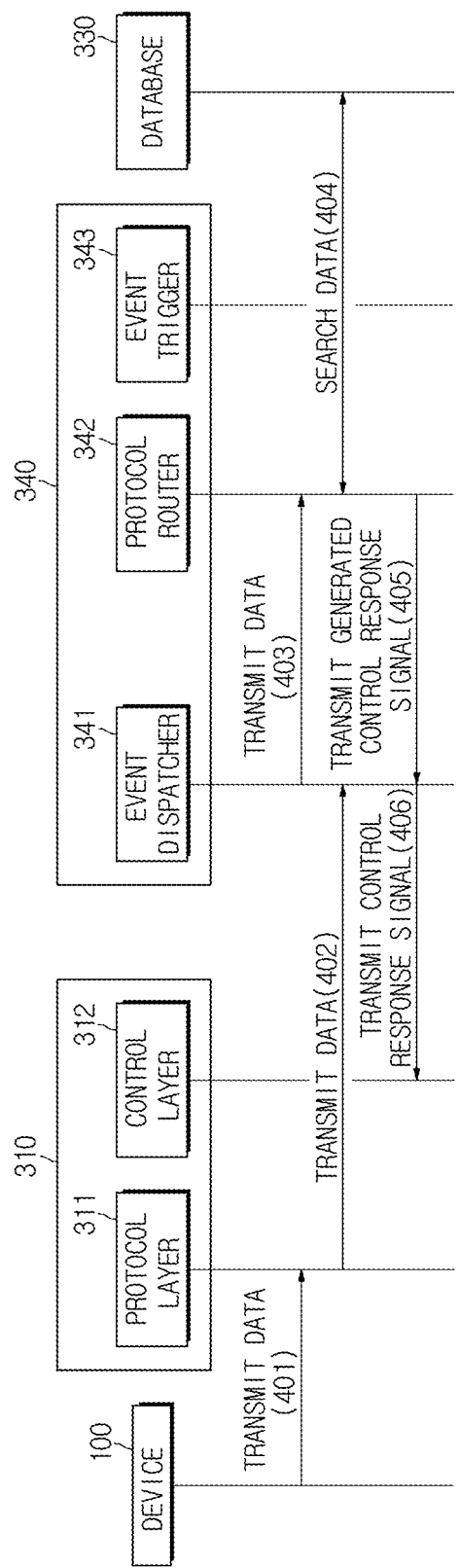
FIGS. 9 and 10 are flowcharts illustrating the operation of the event processor of the communication apparatus illustrated in FIGS. 7 and 8.
Figure 10:
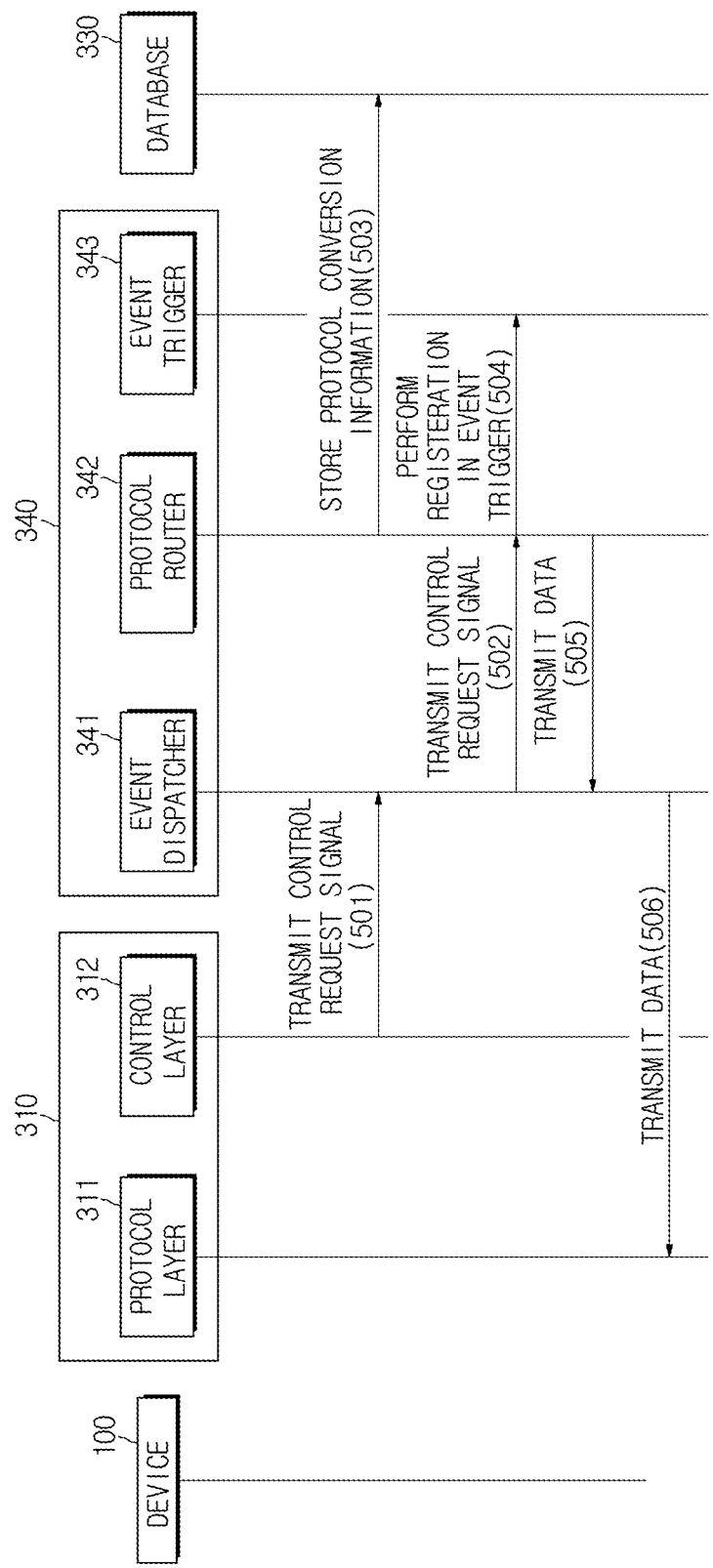

FIGS. 9 and 10 are flowcharts illustrating the operation of the event processor 340 of the communication apparatus 300 illustrated in FIGS. 7 and 8.

FIG. 9 is a flowchart illustrating a process of converting data transmitted from any one device 100 into a control object and transmitting the control object to a destination, e.g., another device 100 or the central controller 200.

The device 100 transmits the data to the protocol layer 311 of the abstraction layer 310 (401).

Here, the data may be transmitted in various forms, for example, a packet or extensible markup language (XML).

The protocol layer 311 transmits the data of the device 100 to the event processor 340 before transmitting the data to the control object. This is for communication between devices 100 using different protocols, and for conversion of the data into a control response signal recognizable by the control object.

That is, the event dispatcher 341 of the event processor 340 determines whether the data transmitted from the protocol layer 311 exists, receives the data of the device 100 upon determining that the data exists (402), and transmits the received data to the protocol router 342 (403).

The protocol router 342 analyzes the data and searches the database 330 for information matched an identifier (ID) of the analyzed data (404).

The event processor 340 generates the control response signal corresponding to the matching information (405), and transmits the generated control response signal to the control layer 312 (406).

The control layer 312 checks a destination and transmits the control response signal to the other device 100 or the central controller 200 corresponding to the checked destination.

FIG. 10 is a flowchart illustrating a process of transmitting a control request signal from the interface 320 to the device 100 or the central controller 200.

The interface 320 transmits a command input by a user, as the control request signal, to the control layer 312 of the abstraction layer 310.

The control layer 312 transmits the received control request signal to the event processor 340 before transmitting the control request signal to a destination (501). This enables communication between different protocols and conversion between protocols as required.

In addition, the control layer 312 may analyze the control request signal received from the interface 320 and may store analysis information in the database 330.

The event processor 340 determines whether the control request signal is received from the control layer 312. In this case, the control request signal is received by the event dispatcher 341.

Upon determining that the control request signal has been received, the event dispatcher 341 of the event processor 340 transmits the received control request signal to the protocol router 342 (502).

The protocol router 342 analyzes the received control request signal and determines whether protocol conversion is required, based on a result of the analysis.

Here, in order to determine whether protocol conversion is required, it is determined whether protocols of a control object and a protocol object are equal. Upon determining that the protocols are equal, it is determined that protocol conversion is not required. Otherwise, upon determining that the protocols are not equal, it is determined that protocol conversion is required.

For comparison, if there is a plurality of objects corresponding to destinations to receive the control request signal, the protocol of the control object is compared with protocols used by all of the objects.

Upon determining that protocol conversion is required, the protocol router 342 of the event processor 340 converts the control object into the protocol object.

When the control object is converted into the protocol object, if there is a plurality of objects corresponding to destinations, the control object is converted into each of protocol objects corresponding to all of the objects.

That is, the protocol router 342 converts the control object into the protocol objects and generates a protocol event request signal regarding each protocol object. Here, the protocol event request signal includes, for example, data related to operation of the device 100.

Then, protocol conversion information related to conversion of the control object is stored in the database 330 (503).

The protocol router 342 of the event processor 340 determines whether the control request signal is a signal to be periodically triggered, and registers the control request signal and the protocol conversion information related to the control request signal in the event trigger 343 upon determining that the control request signal is the signal to be periodically triggered (504).

The protocol router 342 of the event processor 340 transmits data related to operation of the device 100 corresponding to the protocol event request signal, to the event dispatcher 341 (505), and the event dispatcher 341 transmits the data to the device 100 or the central controller 200 which performs communication using at least one protocol object (506).

An example wherein a source object is the control object and destination objects are a first protocol object and a second protocol object will now be described briefly. The control layer 312 analyzes a control request signal received from the interface 320 and then transmits a command ID to the protocol router 342.

The protocol router 342 searches for destination objects registered using the command ID of the control object, and generates and transmits a protocol event request signal to found destination objects.

The protocol layer 311 generates data using the protocol event request signal of the first and second protocol objects and transmits the generated data to each of operatively coupled devices 100. As such, data routing is performed between the devices 100 using different protocols.

As described above, since operatively coupled control is allowed between devices using different protocols, extensibility and flexibility may be achieved.

Additionally, since an abstraction layer is divided into a control layer and a protocol layer, an interface may not be changed even when protocols are added, protocol conversion may be easily performed, and routing between multiple protocols may be performed using, for example, a logic editor.

As is apparent from the above description, since operatively coupled control is allowed between devices using different protocols, extensibility and flexibility may be achieved.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated hardware-based computer or processor unique to that unit or by a hardware-based computer or processor common to one or more of the modules. The described methods may be executed on a general purpose computer or processor or may be executed on a particular machine such as the communication apparatus described herein.

Since integrated event processing is performed between devices, conversion and routing between different protocols may be performed.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A communication apparatus comprising:
  a communication interface to receive first data from a first device of a plurality of devices and transmit second data to a second device of the plurality of devices;
  a display to display the first device and the second device; and
  a processor to execute:
    a user interface to select the displayed first device having a first protocol having the first data stored as a first programming language data type and the displayed second device of the plurality of devices having a second protocol, different from the first protocol, to store the second data as the first programming language data type;
    a logic editor configured to set routing information to enable communication between the displayed first device and the displayed second device;
    a protocol layer to convert the first protocol of the first device into an instance of an object of an object-oriented protocol, and
    a control layer to convert the instance of the object into a preset control object, to convert the preset control object into an instance of the second protocol, and to copy the received first data in the first protocol as the second data in the second protocol to be transmitted to the second device,
    wherein the logic editor includes:
      a first logic to receive first data of the displayed first device,
      a second logic to convert the first data to the second data, and a third logic to output the converted second data of the second logic to the displayed second device communicating through the control layer,
wherein an input terminal of the second logic is connected to an output terminal of the first logic, and an input module of the third logic is connected to an output module of the second logic.

2. The communication apparatus according to claim 1, further comprising a database to store connection information between the protocol layer and the control layer.

3. The communication apparatus according to claim 2, wherein the database further stores data types of the protocol objects.

4. The communication apparatus according to claim 1, further comprising an interface to interconnect the protocol layer and the control layer.

5. The communication apparatus according to claim 4, wherein the interface comprises an object mapper to check protocol objects having the same data type, to output devices connected to the checked protocol objects as objects, and to perform mapping on one of the protocol objects selected by a user.

6. The communication apparatus according to claim 4, wherein the logic editor is further configured to interconnect input and output modules of a plurality of objects selected by a user.

7. The communication apparatus according to claim 1, further comprising an event processor to convert data received by the protocol layer from a transmitting device, into a control response signal of a control object, and to perform protocol conversion to transmit a control request signal received by the control layer from an interface, to at least one other device.

8. The communication apparatus according to claim 7, wherein the event processor comprises:
an event dispatcher to transmit and receive the control response signal and the control request signal between the protocol layer and the control layer;
a protocol router to convert the data transmitted from the protocol layer to the control layer, into the control response signal, and to convert a protocol of the control request signal transmitted from the control layer to the protocol layer.

9. The communication apparatus according to claim 8, wherein the event processor further comprises an event trigger to store a time according to each control request signal, and connection information between the control object and a protocol object according to the control request signal, and to transmit the connection information to the protocol router upon determining that the time corresponds to a time to output the control request signal as an event signal.

10. The communication apparatus according to claim 9, wherein the protocol router of the event processor determines whether a new control request signal is a signal to be periodically triggered, if the new control request signal is received, and transmits the new control request signal to the event trigger upon determining that the new control request signal is the signal to be periodically triggered.

11. The communication apparatus according to claim 8, wherein the protocol router of the event processor determines whether protocol conversion is required if a new control request signal is received, performs protocol conversion upon determining that protocol conversion is required, and transmits protocol conversion information to a database.

12. The communication apparatus according to claim 7, further comprising a database to store connection information and conversion information between the control object and a protocol object according to each control request signal, and the control response signal according to the data.

13. The communication apparatus according to claim 7, wherein the protocol layer verifies validity of the received data, and the control layer verifies validity of the received control request signal.

14. A method comprising:
displaying, on a window of a display, a subset of devices of a plurality of devices in which the subset of devices share a same programming language data type while not displaying other devices of the plurality of devices with different programming language data types;
receiving a selection of a first device, of the subset of devices, having a first protocol having first data stored as a the same programming language data type and a second device, of the subset of devices, having a second protocol, different from the first protocol, to store the second data as the same programming language data type;
setting, using a logic editor, routing information to enable communication between the first device and the second device;
receiving the first data from the first device;
converting, using a protocol layer, the first protocol of the first device into an instance of an object of an object-oriented protocol;
converting, using a control layer, the instance of the object into a preset control object;
converting, using the control layer, the preset control object into an instance of the second protocol,
copying the received first data in the first protocol as the second data in the second protocol; and
transmitting the second data to the second device,
wherein the setting the routing information includes:
obtaining a first logic to receive first data of the displayed first device,
obtaining a second logic to convert the first data to the second data,
obtaining a third logic to output the converted second data of the second logic to the displayed second device communicating through the control layer,
connecting an output terminal of the first logic to an input terminal of the second logic, and
connecting an output terminal of the second logic to an input terminal of the third logic.

15. A non-transitory computer-readable storage medium encoded with computer readable code comprising a program for implementing the method of claim 14.

16. A building automation system comprising:
a plurality of devices; and
a communication apparatus comprising:
a communication interface to receive first data from a first device of a plurality of devices and transmit second data to a second device of the plurality of devices;
a display to display the first device and the second device; and
a processor to execute:
a user interface to select the displayed first device having a first protocol having the first data stored as a first programming language data type and the displayed second device of the plurality of devices having a second protocol, different from the first protocol, to store the second data as the first programming language data type;

a logic editor configured to set routing information to enable communication between the displayed first device and the displayed second device;
a protocol layer to convert the first protocol of the first device into an instance of an object of an object-oriented protocol, and
a control layer to convert the instance of the object into a preset control object, to convert the preset control object into an instance of the second protocol, and to copy the received first data in the first protocol as the second data in the second protocol to be transmitted to the second device,
wherein the logic editor includes:
  a first logic to receive first data of the displayed first device,
  a second logic to convert the first data to the second data, and
  a third logic to output the converted second data of the second logic to the displayed second device communicating through the control layer,
  wherein an input terminal of the second logic is connected to an output terminal of the first logic, and an input module of the third logic is connected to an output module of the second logic.

* * * * *